United States Patent
Geiger

[15] 3,690,539
[45] Sept. 12, 1972

[54] HEAT AND AIR ACTION APPARATUS FOR ELECTRONIC CIRCUITRY REPAIRS

[72] Inventor: Joseph A. Geiger, 7258 Parkwood Court, Falls Church, Va. 22042

[22] Filed: Sept. 25, 1970

[21] Appl. No.: 75,319

[52] U.S. Cl. ...................... 228/20, 15/344, 219/229, 228/21
[51] Int. Cl. ........................... B23k 11/00, B23k 5/22
[58] Field of Search .... 228/19, 20, 21; 219/229, 230, 219/231; 15/344, 345

[56] References Cited

UNITED STATES PATENTS

| | | | |
|---|---|---|---|
| 2,955,187 | 10/1960 | Campo | 228/20 |
| 2,955,188 | 10/1960 | Campo | 219/230 X |
| 3,392,897 | 7/1968 | Siegel | 228/20 |
| 3,561,662 | 2/1971 | Duhaime | 228/20 |

*Primary Examiner*—John F. Campbell
*Assistant Examiner*—Robert J. Craig

[57] ABSTRACT

A heat and air action apparatus for repairs on electronic circuitry capable of melting solder connections and of vacuum-collecting or air-jet-dispersing the melted solder or other air-entrainable matter, the apparatus including, in axial alignment, a heater, a central hub, and a barrel with an air connection. An air conduit links the hollow heater tip to the air connection, the conduit including solid-matter-separating means in the form of either a trajectory trap or a container-shaped filter body, or both, arranged inside the barrel. The air connection is preferably at the hub-side of the barrel, including a finger-closable bypass opening. A more versatile embodiment includes a finger-operable flow control valve for either a single air connection, or for separate air connections for vacuum and for pressure.

32 Claims, 13 Drawing Figures

HEAT AND AIR ACTION APPARATUS FOR ELECTRONIC CIRCUITRY REPAIRS

BACKGROUND OF THE INVENTION

1. Field of the Invention

The invention relates to apparatus for electronic circuitry repairs, and in particular to heat and air action apparatus capable of melting fusible material, such as solder, and for vacuum-collecting or air-jet-dispersing the melted material or other air-entrainable matter.

2. Description of the Prior Art

Prior art apparatus include several so-called desoldering tools, where a hollow heatable tip is either surrounded by a heater, or where the tip itself forms concentric electrodes. In all of these cases, the melted fusible material, normally tin solder, is sucked into the apparatus by a vacuum-induced air flow passing through the tip into some kind of collecting cavity inside the body of the apparatus. The air and the droplets of melted solder entrained by it are drawn through an elongated chamber, at the down-stream end of which is arranged a trap plate. The solder droplets splatter against this plate, while the air is sucked off through a narrow annular gap between the plate and the chamber wall.

These prior art devices have the shortcoming that the solidifying solder droplets have a tendency to quickly plug up the air flow gap, because the air is drawn off in a direction generally corresponding to the trajectory of the solder droplets inside the solder collecting chamber. Attempts to overcome this difficulty by heating the solder collecting chamber to maintain the solder in its melted state are faced with such new problems as manipulative limitations and difficulties in solder removal from the chamber.

The solder collecting capacity of the prior art solutions is very limited, accounting for the necessity of frequent work interruptions for cooling and cleaning. Other manipulative limitations are due to the fact that no air flow controls are provided at the various prior art apparatus, and that the devices are not adaptable for use in a vacuum-cleaning mode to collect debris and other air-entrainable matter.

SUMMARY OF THE INVENTION

The improvements offered by the invention suggest a new apparatus serving not only as a useful tool in the solution of desoldering problems, but also as a hot-air melting apparatus for the removal of protective coatings and as a versatile debris collecting tool. The apparatus offers quick adaptability to a variety of special work conditions.

In addition to the conventional elements of a desoldering tool, viz. heatable hollow tip, vacuum conduit and solder chamber, the inventive apparatus includes solid-matter-separating means in the form of either a trajectory trap, or a container-shaped filter body, or a combination of the two. The trajectory trap takes advantage of the difference in mass and motion inertia between the air and the solid matter entrained by it; the air, when flowing at high speed from a small channel into a much wider channel, decelerates quickly for easy lateral withdrawal, while the heavier solid matter particles entrained by the air tend to maintain their speed and trajectory, "shooting" through the decelerating air into a collecting pocket. This trajectory trap is particularly effective with melted tin solder (the term "solid matter" as employed here being intended to include normally solid matter, such as solder, which is temporarily in a melted or solidifying stage).

The container-shaped filter body, employed either separately or in combination with the trajectory trap, permits withdrawal of the air through an air-permeable side wall, while retaining the solid matter inside the filter body. The latter may be of an inexpensive material, rendering the filter "disposable". The trajectory trap and/or filter body are arranged inside a barrel and are quickly removable from the barrel, or together with the barrel, for convenient cleaning or conversion to different work conditions.

The invention further suggests the provision of finger-operable air valve controls at the hub of the apparatus, including a finger-closable bypass opening. These controls permit quick, convenient adjustment of the air speed, complete reversal of the air flow in the case of twin air supply lines, and precise stop-and-start control of the air flow.

BRIEF DESCRIPTION OF THE DRAWINGS

Further special features and advantages of the invention will become apparent from the description following below, when taken together with the accompanying drawings which illustrate, by way of examples, several embodiments of the invention, represented in the various figures as follows.

DESCRIPTION OF THE PREFERRED EMBODIMENTS

FIGS. 1 to 4 of the drawing show four versions of the inventive apparatus, all of identical outward appearance and each one incorporating one or several characteristics of the present invention.

In each case, the apparatus 10 includes a central hub 11 by which it can be held and manipulated with the fingers of a hand in the manner of a hand in the manner of a stylus. Extending forwardly from the hub 11 is arranged a cylindrical heater assembly 12 holding a hollow heater tip 13 in the front portion of its central bore. (For the sake of simplicity and clarity of the drawing, the electric leads supplying current to the resistance heater of FIGS. 1–4 have been omitted.) A cylindrical barrel 14 extends rearwardly from the hub 11, the forward end of the barrel being sealingly seated inside an axial bore forming a barrel seat 15. The rear end of the barrel 14 is in each case closed off by an end cap 16 which in turn holds in its center a tubular outside air connection 17, the latter communicating with the interior air conduit system of the apparatus. To the air connection 17 can be connected any known source of air pressure and vacuum (not further described here), a flexible hose 18 preferably serving as the connecting conduit. It is in regard to the interior air conduit system that the four versions of the apparatus differ from one another.

Figure 1:
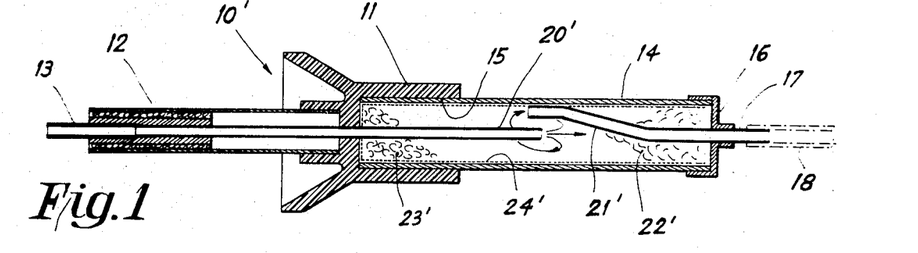
FIG. 1 shows a somewhat simplified first embodiment of the invention incorporating a trajectory trap.

The first embodiment—FIG. 1—shows a straight central accelerating tube 20' extending from the hollow heater tip 13 through the hub 11 and, via a sealed passage, into the center of the barrel 14. A suction tube 21', of which the outside air connection 17 forms the rearward end portion, extends into the barrel 14 from the opposite end, but in such a way that the ends of the tubes 20' and 21' are out of axial alignment and preferably overlapping longitudinally. Thus, if an appreciable vacuum is applied to the air connection 17, while the tip 13 is in contact or near contact with melted solder, for example, the high-speed air flow generated by the vacuum will entrain the melted solder into the apparatus in the form of solder droplets. Entering through the tip 13, the air and solder droplets exit from the accelerating tube 20' into the barrel 14 at approximately the same speed, whereupon the air flow is rapidly decelerated, moving in a loop toward the opening of the suction tube 21', while the solder droplets continue their journey until they splash against the rear end of the barrel 14 or against an accumulation of solder shown at 22' in FIG. 1. The rear portion of the barrel thus serves as a collecting pocket for the solder. The solder accumulated at 22' does not in any way obstruct the continued air flow. Because the melted solder is tacky while solidifying, it tends to adhere to the accumulation at 22', while other solid matter accumulated inside the barrel 14 may collect near the forward end of the barrel, as shown at 23'. For quick removal of the accumulations at 22' and 23' from the barrel 14, the invention further proposes the insertion of a disposable heat-resistant liner 24' into the barrel 14. The liner 24' will prevent any solidifying solder from adhering to the barrel wall.

Figure 2:
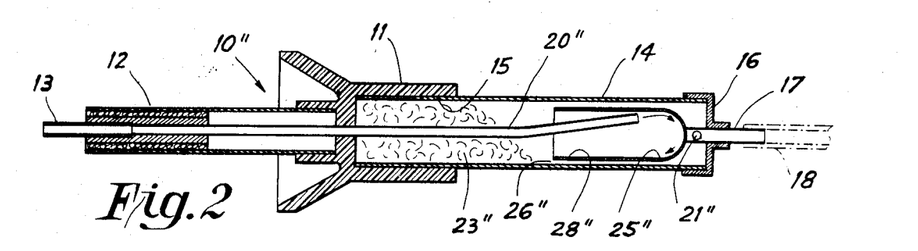
FIG. 2 shows a similarly simplified second embodiment incorporating a different trajectory trap.

The second embodiment—FIG. 2—shows a longer accelerating tube 20" extending into the rear portion of the barrel 14, where a smooth hemispherical deflecting cap 25" is so positioned that the flow of air and solid matter is deflected 180 degrees toward the front end of the barrel. To achieve this, the rear end of the tube 20" is so oriented that the flow emerging therefrom reaches the inner curvature of the cap 25" at a tangent thereto. The tube 20" and the cap 25" are preferably of a material which cannot be wetted by melted solder. An annular suction gap 26" is provided between the cap 25" and the barrel wall, so that the air, after deflection and deceleration inside the deflecting cap 25", reverses its direction again to flow off through the gap 26" into the suction tube 21", while the faster-moving solid matter continues its motion toward the accumulation at 23". Thus, the barrel 14 forms only a single collecting pocket. Here, too, a barrel liner (not shown) may be provided to facilitate emptying of the barrel. The deflecting cap 25" is held in position by the suction tube 21" to which it is attached.

Figure 3:
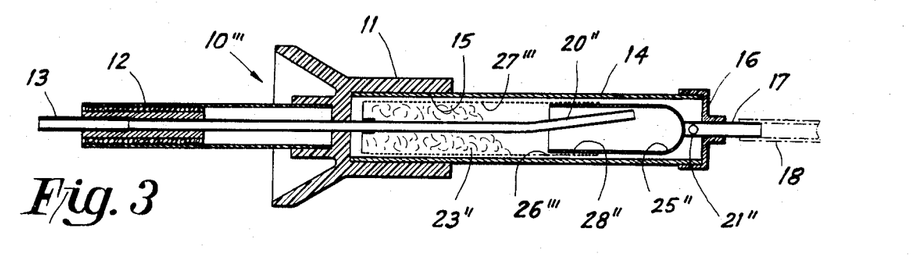
FIG. 3 shows a modification of the embodiment of FIG. 2 incorporating a filter body combined with the trajectory trap of FIG. 2.

An embodiment very similar to the one just described is shown in FIG. 3, the only difference being an additional filter cylinder 27'" which is fitted over the cylindrical portion 28" of the deflecting cap 25". The wall of the filter cylinder is air-permeable, but retains any solid matter, even light-weight or finely granulated material, which otherwise might escape through the suction gap 26'". Obviously, no barrel liner is required in this case. The filter cylinder 27'" may be of the "disposable" type, using inexpensive heat-resistant paper for its wall.

Figure 4:
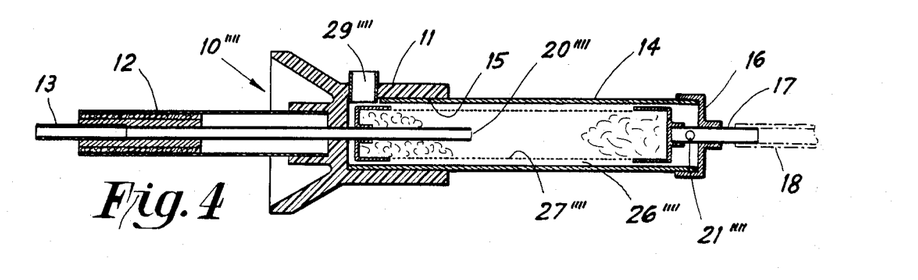
FIG. 4 shows a similarly simplified third embodiment incorporating a different cylindrical filter body.

The third embodiment—FIG. 4—shows a shortened accelerating tube 20'''' reaching into a filter cylinder 27'''' which occupies a major part of the barrel 14, leaving only an annular suction gap 26'''' therebetween. The suction tube 21'''' positions the rear end of the filter cylinder 27''''. Functionally, this embodiment resembles that of FIG. 1, except for the fact that the air is not looped back, but led off sideways across the wall of the filter cylinder 27''''. The filter cylinder is again preferably of disposable material.

The embodiment of FIG. 4 includes, in its hub 11, a finger-closable bypass conduit 29'''' which permits a quick and accurate stop-and-start control of the suction action at the heater tip 13. The same bypass conduit could equally well be incorporated in the apparatus of FIG. 3. This bypass conduit offers an additional advantage, in that the air being sucked through the open bypass conduit 29'''' passes along the annular gap 26'''', thereby cooling the hub 11 as well as the barrel 14.

The barrel 14 of the various FIGS. 1 to 4 can be opened by either removing the rear end cap 16 or, preferably, by removing the barrel 14 together with its contents from the barrel seat 15. This feature is described in more detail further below (in connection with FIG. 5). The latter possibility permits quick conversion of the apparatus from one particular solid-matter-separating mode to a different mode, by simply inserting a new barrel 14 with different separating means and by interchanging the central accelerating tube 20, if necessary. The possibility of quickly exchanging the barrel with its filter body or liner against a fresh, empty unit further shortens any work interruption necessary, permitting convenient emptying of the barrel at a later time. It may also be indicated to use interchangeable barrels of varying sizes to suit different work requirements.

Figure 5:
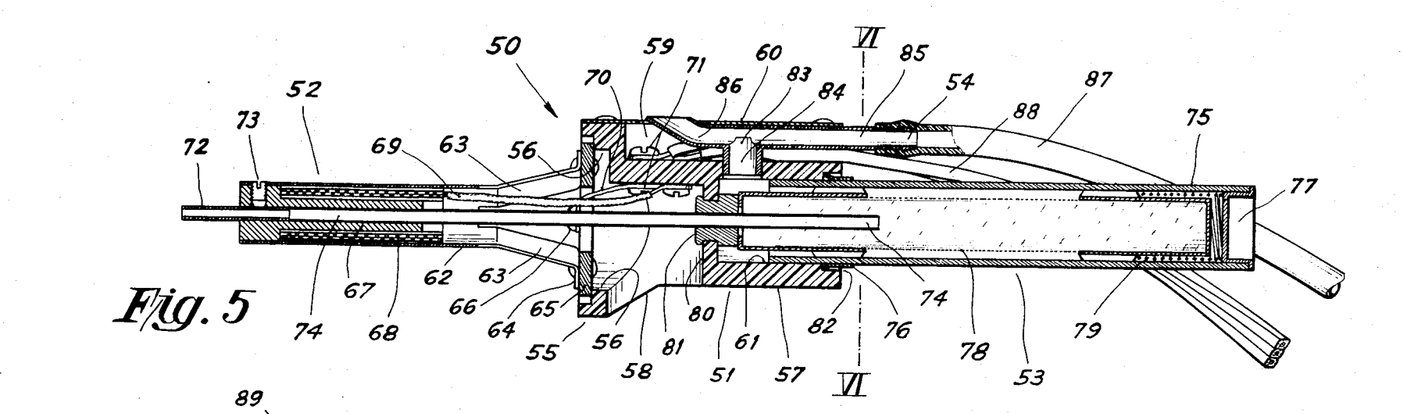
FIG. 5 shows a detailed longitudinal cross-section of a fourth embodiment of the invention, the apparatus incorporating an air bypass in addition to a filter body and a trajectory trap.

A fourth embodiment of the invention is shown in greater detail in FIG. 5. Here again, the apparatus 50 consists essentially of a central hub 51, a heater assembly 52 extending forwardly from the hub, a barrel assembly 53 extending toward the rear, and an air connection 54. This embodiment is functionally comparable to the apparatus of FIG. 4, except that the air connection 54 is provided at the hub 51, and not at the rear end of the barrel.

The hub 51 is of electrically insulating, thermally slow-conductive material, such as phenolic, for example. It has a forward flange 55 of enlarged diameter, the peripheral contour of the flange being preferably hexagonal. (The expression "diameter", as used in this specification, should be understood to include any suitable cross-sectional configuration, not merely that of a circle.) Inside the flange 55 are arranged four mounting noses 56 forming a radial mounting face, to which the heater assembly 52 is detachably mounted. Two of these noses—not visible in FIG. 5—are large enough to accomodate screws (reference numeral 66). The main part of the hub 51 is formed by a smaller-diameter grip portion 57 and a tapered transition portion 58 between the flange 55 and the grip portion 57. Radially above the grip portion 57, the hub 51 includes a longitudinal connecting box 59 topped by a flat cover 60. Inside the grip portion is arranged a barrel seat 61 in the form of an axial bore which is open to the rear of the hub 51.

The heater assembly 52 includes a generally cylindrical heater casing 62 whose rear portion is longitudinally split into four mounting legs 63 which are bent radially outwardly, with their leg end portions 64 aligned in a common radial plane. To these leg end portions is attached, by rivets, for example, a flat mounting ring 65 of insulating, heat-resistant material. The mounting ring 65 is held against the mounting noses 56 of the hub 51 by two screws 66. The heater casing 62, in its forward portion, holds a cylindrical heater core 67 which is surrounded by an insulated resistance heating coil 68. Its two leads 69, as well as a ground wire 70, are detachably connected to the electric cord 88 at the electric terminals 71 arranged inside the hub. Projecting forward from the heater assembly 52 is a hollow, detachable heater tip 72, a set screw 73 holding the tip in place. The bore of the heater tip 72 communicates on its rear end with a central accelerating tube 74 which extends rearwardly into the hub 51 and through the barrel seat 61.

The barrel assembly 53 consists essentially of a cylindrical barrel 75, a lock collar 76 near the forward end of the barrel, an end plug 77 at its rear extremity, and inside the barrel, a generally cylindrical filter body 78 and a calibrated spring 79. The portion of the barrel forward of the lock collar 76 is sealingly seated inside the barrel seat 61 of the hub 51. The bottom of the barrel seat 61 is formed by a flat transverse wall 80 with a central bore in which it carries a positioning plug 81, preferably of silicone rubber. The spring 79 urges the filter body against the plug 81 to seal the inside of the filter body 78 against the barrel 75, while the plug 81 forms a sealed passage for the accelerating tube 74. At the open end of the barrel seat 61 is provided a special shoulder bore 82 of a diameter matching that of the lock collar 76. These two elements will be described in more detail further below (in connection with FIG. 6).

Inside the connecting box 59 of the hub is arranged an air conduit in the form of a T-connector 83; a short tube, the stem of the T, forming a radial conduit portion 84, and a longer tube, the bar of the T, forming to one side an axial conduit portion 85 extending through the rear of the connecting box 59 and to the other side a bypass conduit 86 extending forwardly and upwardly through the cover 60 for finger access. The air connection 54 is at the rear extremity of the axial conduit portion 85. To it may be attached a flexible air hose 87. The connection box 59 also accomodates the upper ends of the electrical terminals 71 to which is connected a three-wire electric cord 88. The cord 88 and the T-connector 83 are superposed inside the connector box 59 and held in place by the cover 60.

Figure 6:
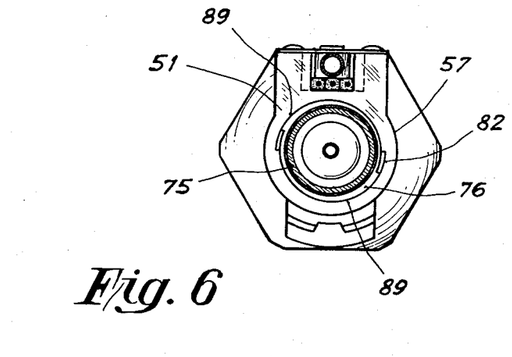
FIG. 6 shows a cross-section of the apparatus of FIG. 5 taken along the line VI—VI of FIG. 5.

In FIG. 6 it can be seen how the lock collar 76 cooperates with the shoulder bore 82 to form a quick-release lock between the barrel 75 and the hub 51. The matching contours of the collar 76 and bore 82 interact in the manner of two oppositely arranged clamping cams 89, when the barrel 75 is rotated clockwise against the hub. The peripheral contour shown in FIG. 6 is composed of two symmetrically offset semicircles; ideally, however, they should be spirals of constant angular rise.

Figure 7:
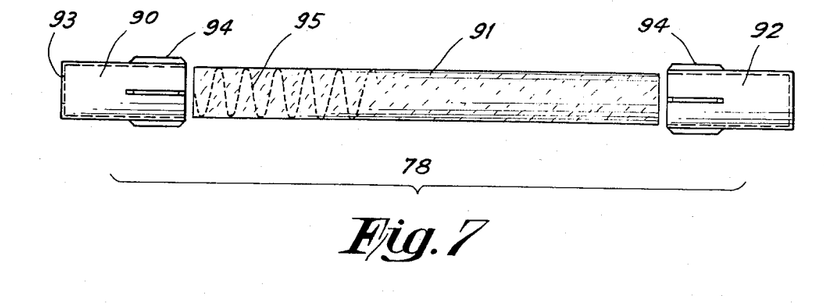
FIG. 7 shows details of the filter body of FIG. 5.

In FIG. 7 are shown the separate component parts of the filter body 78. They include an open forward end cap 90, a filter cylinder 91 open at both ends, and a closed rear end cap 92. The end caps are identical, except for the opening 93 in cap 90, necessary for the passage of the accelerating tube 74. On their periphery, the caps 90 and 92 have several rib-shaped protrusions 94 for the positioning of the filter body 78 inside the barrel 75. The filter cylinder 91 has an air-permeable, heat-resistant wall and is made preferably of a low-cost material, thereby simplifying cleaning of the apparatus by merely discarding the cylinder together with the debris accumulated therein. Such a low-cost material is impregnated filter paper, for example. For better protection of the filter cylinder 91 during handling and storage, and in order to prevent a thin cylinder from collapsing under high outside pressure in the air jet-mode of operation, the wall of the cylinder can be supported by a wire coil 94.

In practical use, the apparatus of FIGS. 5 to 7 permits five basic modes of operation: (a) heating without air flow, (b) hot airjet, (c) cold airjet, (d) hot air suction, and (e) cold air suction. The first mode is employed in melting fusible materials, especially tin solder; the second mode can be used for various melting and drying operations; the third mode is useful for cleaning and testing purposes; the fourth mode serves primarily for the removal of solder connections; and in the fifth mode, the apparatus can be used as a general-purpose miniature vacuum cleaner.

While the source of air flow is not specified herein in any detail, it is obviously preferable to have an air supply which is selectively adjustable to a pressure mode and a vacuum mode at varying pressure levels. As will be seen further below, the means to obtain these adjustments can also be an integral part of the apparatus itself.

When an air flow is created in the air hose 87, with the apparatus equipped as shown in FIG. 5, the air flow will pass through the bypass conduit 86, while little or no air will pass through the smaller central apparatus conduit constituted by the heater tip 72, the accelerating tube 74, and the wall of the filter cylinder 91. However, as soon as a finger is placed over the opening of the bypass conduit, the entire air flow will be instantly switched to the apparatus conduit, creating an impact-like pressure potential at the heater tip due to the prior existance of a fast-moving air column which is suddenly interrupted at the bypass opening. In the opposite case, removal of the finger from the bypass opening will immediately stop the air flow through the apparatus conduit.

In the air suction mode, the apparatus further permits visual control of the pressure drop across the wall of the filter cylinder 91, a certain level of pressure drop indicating that the filter should be emptied or replaced by an empty one. This visual control involves the observation of the position of the filter body 78 inside the barrel 75. For this purpose, it is necessary that either the barrel 75 itself or the rear end plug 77 is transparent, to permit observation of the axial displacement of the filter body 78 against the calibrated spring 79. The higher the existing pressure drop, the greater will be the resultant force urging the filter body 78 to the right against the spring 79. Thus, at a predetermined pressure drop, the spring force will be overcome and the filter body 78 will move against the end plug 77.

Figure 8:
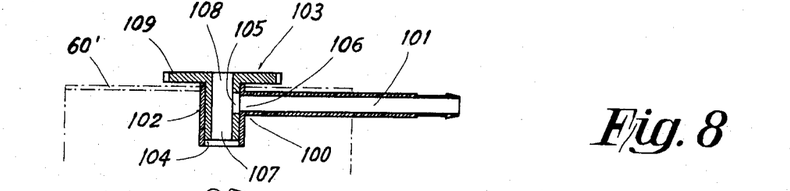
FIGS. 8 and 9 show, in a sectional elevation and a plan view, respectively, a single-line flow control valve with an air bypass designed to be incorporated in the apparatus of FIG. 5.

The three figure pairs FIGS. 8/9, 10/11, and 12/13 show each an additional variant of an air conduit for the apparatus of FIG. 5, these air conduits being interchangeable with the T-connector 83. This interchangeability increases the versatility and the adaptability of the apparatus to different air supply systems.

Figures 9, 10:
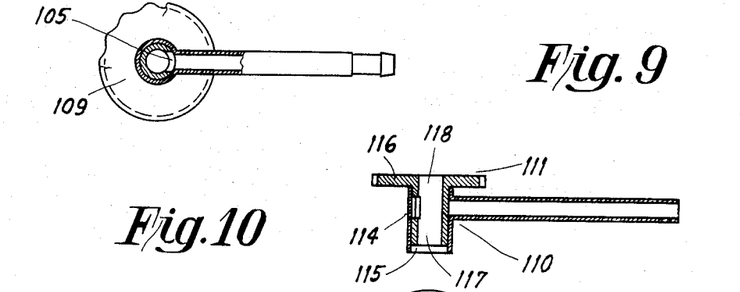
FIGS. 10 and 11 show similar views of a twin-line flow control valve with air bypass for incorporation into the apparatus of FIG. 5.

In FIGS. 8 and 9, a second variant of the air conduit has again the form of a T-connector 100, with a long tube, the stem of the T, representing the axial conduit portion 101, and a shorter but larger tube, the bar of the T, forming a valve a valve seat 102 for a rotary air flow valve 103. Inside the valve seat 102 is arranged a rotatable hollow valve core 104 with a radial opening 105 which faces the opening 106 of the axial conduit portion 101. The longitudinal through-bore of the valve core 104 thus forms a radial conduit portion 107 below the radial opening 105 and a bypass conduit 108 above it. The valve core 104 includes at its upper end a control wheel 109 which is positioned above the cover 60'. Both the wheel 109 and the bypass conduit 108 are thus conveniently operable by a finger, the valve permitting continuous adjustment of the amount of air flow, while the bypass permits quick switching of the air flow into the apparatus conduit and away from it.

Figures 11, 12:
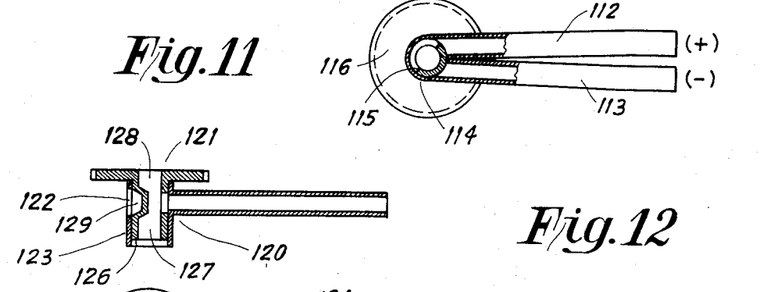
FIGS. 12 and 13 show corresponding views of a still different twin-line flow control valve with air bypass for incorporation into the apparatus of FIG. 5.

In FIGS. 10 and 11, a third variant of the air conduit includes a T-connector 110 with an air flow valve 111, the T-connector having two approximately parallel stems representing two separate axial conduit portions 112 and 113 for oppositely directed air flows, the conduit portion 112 supplying pressure (+), and the conduit portion 113 supplying vacuum (−). The two axial conduit portions open side-by-side into the valve seat 114. The valve core 115 is similar to the valve core 104 of FIG. 8, rotation of its control wheel 116 permitting selective connection of the radial conduit portion 117 and bypass conduit 118 to either suction or pressure in the manner of a three-way valve. FIG. 11 shows the valve core 115 in a position which indicates a reduced flow of air from the pressure supply (+), such a low-speed airjet being desirable for operational mode (b), hot-air melting, for example.

Figure 13:
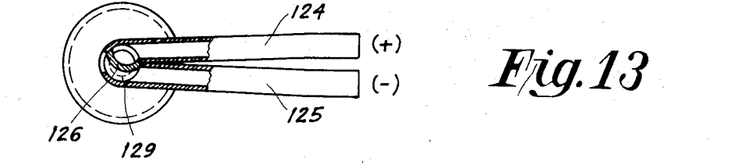

FIGS. 12 and 13 show a fourth variant of the air conduit, with a T-connector 120 and an air flow valve 121 similar to the corresponding parts 110 and 111 of FIGS. 10/11. However, the T-connector 120 additionally has a radial breather opening 122 in the valve seat 123 opposite the area where the two axial conduit portions 124 and 125, for pressure (+) and for vacuum (−), respectively, open into the valve seat 123. The valve core 126 again has a radial conduit portion 127 and a bypass conduit 128, and it further has in its wall a depression forming a transverse groove 129, the groove extending over at least one-half of its circumference and facing the breather opening 122. This transverse groove 129 opens one of the axial conduit portions to the breather opening 122, and thus to the atmosphere (via the connecting box 59), when the other axial conduit portion is communicating with the bore of the valve core 126. Thus, as shown in FIG. 13, the bore of the valve core 126 is open to the pressure supply through the conduit 124, while the vacuum supply is open to the atmosphere. This type of air flow valve is necessary for a so-called closed-circuit air supply system, i.e. where both the pressure and the vacuum are produced by the same pump, without an accumulator tank or its equivalent in the circuit. In contrast, the air flow valve 111 of FIGS. 10/11 is called for, when pressure and vacuum are supplied independently of one another. Thus in their respective neutral positions, the valve 111 blocks off both supply lines, while the valve 121 of FIGS. 12/13 short-circuits the vacuum and pressure lines, allowing the pump to simply recirculate the air.

It should be understood, of course, that the foregoing disclosure relates to only preferred embodiments of the invention, and that it is intended to cover all changes and modifications of the examples of the invention herein chosen for the purposes of the disclosure which do not constitute departures from the spirit and scope of the invention as set forth in the appended claims.

I claim:

1. An apparatus for melting fusible material and for vacuum-collecting or airjet-dispersing the melted material or other air-entrainable heaver-than-air matter, comprising in combination:

a body assembly including a grip portion for holding and manipulating the apparatus with one hand;

a heater assembly extending forward from the body assembly and including a hollow heating tip at its foremost extremity;

air connection means at the body assembly adapted for the hookup to a source of vacuum and air pressure to create an air flow through the heating tip;

a flow conduit extending between the heating tip and the air connection means, the conduit including in its length, in the sense of a vacuum-induced flow of air and heavier matter through the heating tip toward the air connection means, means for separating the heavier matter from the air in a trajectory trap which comprises:

an enlarged-diameter conduit portion where the speed of the air flow is greatly reduced, while the heavier matter entrained by the air continues in its motion free of physical obstruction, the heavier matter thus moving through this conduit portion faster than the air;

a collecting pocket appended to the enlarged-diameter portion in the general direction of exit of the faster moving heavier matter from the enlarged-diameter portion; and a lead-off portion continuing the flow conduit from the enlarged-diameter portion in a direction which is angled off relative to the flow direction of the faster moving heavier matter, thereby causing the airflow to be deviated so as not to enter the collecting pocket, while the heavier matter, through its inertia, traverses the deviating airflow and collects inside the collecting pocket.

2. The apparatus as defined in claim 1, wherein the separating means in the flow conduit include filter means in the form of an air-permeable, solid-matter-retaining wall portion as part of the enlarged-diameter conduit portion, the lead-off portion of the conduit communicating with the enlarged-diameter conduit portion through the filter means.

3. The apparatus as defined in claim 2, wherein the filter means also constitute at least a portion of the collecting pocket, taking the form of a container-shaped filter body, the latter being removable from the apparatus for emptying or disposal.

4. The apparatus as defined in claim 3, wherein the filter body includes a disposable paper shell, the paper being treated for resistance to heat under contact with hot air entraining with it droplets of melted metal and the like into the filter body.

5. The apparatus as defined in claim 1, wherein the body assembly includes a hub representing the grip portion and a closed barrel extending rearwardly therefrom, the heater assembly extending forwardly from the hub; and wherein the flow conduit further includes a central accelerating tube of comparatively small diameter whose forward end communicates with the hollow heating tip through the heater assembly and whose rearward end opens into the barrel, the latter being of comparatively much larger diameter, thus representing the enlarged-diameter portion of the separating means; the air connection means communicating with the inside of the barrel via the lead-off portion of the flow conduit.

6. The apparatus as defined in claim 5, wherein the barrel includes in its rear end portion a detachable deflecting cap forming a generally hemispherical rear terminus for the inside of the barrel; the accelerating tube terminating in the vicinity of this barrel terminus, its rear end portion being oriented substantially tangentially to the hemispherical contour so as to deflect the vacuum-induced flow of air and heavier matter toward the forward end of the barrel with a minimum of loss in speed of the heavier matter; the deflecting cap thus representing a portion of the enlarged-diameter conduit portion, with the forward end portion of the barrel representing the collecting pocket.

7. The apparatus as defined in claim 6, wherein the deflecting cap includes a tubular portion extending forward from the hemispherical rear terminus and having an outer diameter somewhat smaller than the inner diameter of the barrel, so as to form a narrow gap between the deflecting cap and the barrel, the gap thereby representing the lead-off portion of the flow conduit.

8. The apparatus as defined in claim 7, wherein the barrel further includes a tubular filter body to fit the tubular portion of the deflecting cap and of a length to occupy a major portion pocket, the barrel, the filter body thereby representing the collecting pocket, the filter body being removable from the barrel together with the deflecting cap.

9. The apparatus as defined in claim 5, wherein the barrel further includes a loosely fitting liner in the form of a container covering at least a major portion of the inner wall of the barrel including that portion of it which forms the collecting pocket, the liner being of heat-resistant material and removable from the barrel together with the matter collected therein.

10. The apparatus as defined in claim 5, wherein the barrel encloses an air-permeable, solid-matter-retaining filter body in the form of a container occupying a major portion of the interior space of the barrel and positioned to leave an air flow gap between the respective walls of the barrel and filter body; the rearward end of the accelerating tube opening into the filter body, the interior of the body thus representing the enlarged-diameter portion as well as the collecting pocket, while the air-permeable wall of the filter body, in conjunction with the air flow gap, represents the lead-off portion of the flow conduit.

11. The apparatus as defined in claim 10, wherein the air connection means at the body assembly is a part of the hub, communicating with the front portion of the barrel interior via the hub; the filter body thereby being removable from the barrel without disturbing the air connection means.

12. The apparatus as defined in claim 11, wherein the barrel is sealingly connected to the hub by quick-release clamping means, the barrel and filter body thus being readily removable from the apparatus for servicing.

13. The apparatus as defined in claim 1, wherein the flow conduit further includes a bypass conduit normally open to the atmosphere and closable by finger operation; the bypass conduit, when left open, deviating at least a major portion of the air flow away from the heating tip.

14. The apparatus as defined in claim 1, wherein the flow conduit further includes valve means dividing the flow conduit into an upstream conduit portion extending between the air connection means and the valve means, and a downstream conduit portion extending between the valve means and the hollow heating tip, the valve means being operable to control the flow of air through the conduit.

15. The apparatus as defined in claim 14, wherein the air connection means include a second, separate air connection for the hookup to a source of air flow opposite to that in the first-mentioned air connection; and the flow conduit includes a corresponding second upstream conduit portion; and wherein the valve means are operable to selectively connect either of the two upstream conduit portions with the downstream conduit portion and to control the flow of air therethrough.

16. The apparatus as defined in claim 14, wherein the flow conduit further includes a bypass conduit communicating on one end with the downstream conduit portion, the other end of the bypass conduit being normally open to the atmosphere and closable by finger operation, the bypass conduit, when left open, deviating at least a major portion of the air flow away from the heating tip.

17. A stylus-shaped heat and air action apparatus for melting fusible material and for vacuum-collecting or airjet-dispersing the melted material and other air-entrainable heavier-than-air matter, comprising in combination:

a central hub of electrically insulating, thermally slow-conductive material for handling and manipulating the apparatus with one hand, the longitudinal axis of the hub coinciding with the stylus axis; the hub including: a forward flange of enlarged diameter, a smaller-diameter grip portion, a tapered transition portion between the flange and the grip portion, and a longitudinal connection box and cover radially above the grip portion; in the flange a radial mounting face, and inside the grip portion a barrel seat in the form of an axial bore open to the rear of the hub;

a longitudinal heater assembly mounted forward of the hub and including: a generally tubular heater casing detachably mounted by its rear extremity to the mounting face of the hub; in the forward portion of the casing a cylindrical heater core and an insulated resistance-heating coil surrounding the core; inside the core a detachable hollow heater tip extending forward beyond the core and a central accelerating tube extending rearwardly from the core into the hub at least as far as the area of the barrel seat;

a barrel assembly extending rearwardly from the hub and including: a barrel whose forward end portion sealingly engages the barrel seat of the hub, and a rear closure on the barrel, the barrel assembly thus forming an enclosed air space inside the barrel, a filter body in the form of a container occupying a major portion of the enclosed air space and positioned to leave an air flow gap between the respective walls of the barrel and the filter body, the filter body surrounding the rearward end portion of the accelerating tube;

air conduit means at the connection box of the hub including: a connecting tube of which one end forms a radial conduit portion opening into the enclosed air space of the barrel via the barrel seat, while its opposite end portion forms an axial conduit portion extending rearwardly from the hub, the rear end of the axial conduit portion serving as an air connection for a flexible air hose supplying vacuum or pressure; and electrical connecting means in the connection box for the supply of an electric potential to the heating coil via a supply cord attached thereto.

18. The apparatus as defined in claim 17, wherein the barrel and the filter body have the shape of concentric, spaced cylinders, the filter body including radial protrusions positioning it inside the barrel; and wherein the hub further includes a positioning plug at the forward end of the barrel seat sealingly surrounding the accelerating tube; and wherein the barrel assembly is transparent at least in its rear portion; with the barrel assembly further including a spring urging the filter body away from the rear closure into sealing contact with the positioning plug, the spring force being so calibrated that it permits the filter body to visibly move away from the positioning plug under vacuum-induced air flow through the apparatus, whenever the pressure drop in the air flow across the wall of the filter body reaches or exceeds a predetermined level, thereby indicating that the barrel needs to be emptied.

19. The apparatus as defined in claim 17, wherein the filter body includes: an air-permeable paper tube open at both ends; a rear end cap fitting over the rear portion of the paper tube to form a closed rear end for the filter body; a similarly shaped front end cap having a central bore for the passage of the accelerating tube, thereby forming a closed front end, when mounted inside the apparatus; the paper tube being disposable following removal of the end caps.

20. The apparatus as defined in claim 17, wherein the barrel assembly further includes a quick-release collar at its forward end portion for the removal of the barrel assembly from the hub for ready access to the filter body; and wherein:

the barrel seat in the hub includes a recess whose peripheral contour matches that of the quick-release collar; the collar and recess thereby forming cam-type rotational clamping means.

21. The apparatus as defined in claim 17, wherein the air conduit means further include a bypass conduit, the connecting tube and bypass conduit together forming a T-connector, with the stem of the "T" forming the radial conduit portion, and the bar of the "T" extending approximately parallel to the axis of the apparatus, its forward portion forming the bypass conduit and its rearward portion forming the axial conduit portion including the air connection; whereby the forward opening of the bypass conduit is facing outwardly from the connecting box for closing by a finger, the bypass conduit, when left open, deviating at least a major portion of any air flow supplied to the apparatus from its normal flow through the heater assembly and filter body.

22. The apparatus as defined in claim 17, wherein the air conduit means further include a rotary air flow valve in the connecting tube, the rotational axis of the valve pointing radially upwardly through the connecting box; and wherein the air valve includes: a cylindrical valve seat in the valve axis and a cylindrical hollow valve core rotatably and sealingly guided inside the valve seat; the valve seat having a radial opening through which the axial conduit portion of the connecting tube opens into the valve, and the valve core having a corresponding radial opening through its wall which is adjustably openable and closable against the air connection through rotational displacement of the valve core, the lower portion of the hollow valve core opening into the radial conduit portion.

23. The apparatus as defined in claim 22, wherein the hollow valve core includes on its upper end a control wheel positioned above the connecting box cover for convenient finger adjustment; the inside of the valve core being open on both axial ends via a vertical through-bore, the upper end portion of the bore thereby forming a bypass conduit opening through the center of the control wheel and conveniently closable by a finger; the closing of the bypass conduit thereby causing any air flow supplied to the apparatus to immediately pass through the heater assembly and the filter body.

24. The apparatus as defined in claim 22, wherein
the air conduit means further include in the connecting tube a second, separate and parallel axial conduit portion forming at its rear end a corresponding second air connection for a flexible air hose supplying air flow in a direction opposite to that of the air flow in the first-mentioned air hose, with the two axial conduit portions opening side-by-side into the valve seat to form a three-way valve; whereby, through the rotational displacement of the valve core, the air flow through the apparatus can be continuously adjusted between a maximum pressure flow and a maximum vacuum flow, with both kinds of air supply ineffective in an intermediate position.

25. The apparatus as defined in claim 24, wherein
the valve seat further includes a radial breather opening communicating with the atmosphere via the connection box, the breather opening being positioned on the level of the two axial conduit portions but radially opposite thereto; and wherein
the valve core further includes in its wall a transverse groove conduit so positioned that, when the valve core is turned to where one of the axial conduit portions is opened to the inside of the valve core, the other conduit portion is simultaneously opened to the atmosphere via the transverse groove conduit and the breather opening, the valve thereby permitting the use of a closed-circuit air supply system without accumulator to supply both kinds of air flow to the apparatus.

26. The apparatus as defined in claim 17, wherein
the rear portion of the heater casing is longitudinally split into a plurality of wall segments, the several segments being bent radially outwardly to form straddling mounting legs, with the leg end portions extending radially in a common plane; and wherein
the heater casing further includes a flat mounting ring of insulating, heat-resistant material contacting the radial leg end portions on its forward side and the mounting face of the hub on its rearward side.

27. An apparatus for melting fusible material and for vacuum-collecting or airjet-dispersing the melted material and other air-entrainable matter, comprising in combination:
a body assembly including a grip portion for holding and manipulating the apparatus;
a hollow heatable tip at the forward extremity of the body assembly;
means for heating the hollow tip;
air connection means at the body assembly for the hookup to a source of vacuum and air pressure;
a flow conduit extending through the body assembly between the hollow tip and the air connection means;
valve means in the flow conduit dividing the conduit into an upstream conduit portion between the air connection means and the valve means, and a downstream conduit portion between the valve means and the hollow tip, the valve means being operable by the hand holding the apparatus to control the flow of air through the conduit; and
filter means in the downstream conduit portion for separating the heavier matter from the air in a vacuum-induced airflow entraining such heavier matter into the apparatus.

28. The apparatus as defined in claim 27, wherein
the flow conduit further includes a bypass conduit communicating on one end with the downstream conduit portion, its other end being normally open to the atmosphere and closable by finger operation; the bypass conduit, when left open, deviating at least a major portion of the air flow away from the heating tip.

29. The apparatus as defined in claim 27 wherein
the air connection means include a second, separate air connection for the hookup to a source of air flow opposite to that in the first-mentioned air connection; and
the flow conduit includes a corresponding second upstream conduit portion; and wherein
the valve means are operable to selectively connect either of the two upstream conduit portions with the downstream conduit portion and to control the flow of air therethrough.

30. The apparatus as defined in claim 29, wherein
the valve means, when operated to connect one of the two upstream conduit portions with the downstream conduit portion, block off the other upstream conduit portion.

31. The apparatus as defined in claim 29, wherein
the valve means, when operated to connect one of the two upstream conduit portions with the downstream conduit portion, open up the other upstream conduit portion to the atmosphere.

32. An apparatus for melting fusible metal and for vacuum-collecting the melted metal comprising in combination:
a body including means for gripping and manipulating the apparatus with one hand;
a hollow tip protruding from the forward end of the body, and means for heating the hollow tip to a metal-melting temperature;
means for connecting a source of vacuum to the hollow tip so as to create an airflow therethrough;
a collecting chamber for the accumulation of vacuum-entrained droplets of melted metal, the chamber being in communication with, but not traversed by the airflow; and
means for separating from a vacuum-induced flow of air and metal droplets the droplets by imposing on the airflow a sharply angled-off flow direction which cannot be followed by the metal droplets because of their higher motion inertia, the latter thus moving out of the airflow and into the collecting chamber.

* * * * *

UNITED STATES PATENT OFFICE
CERTIFICATE OF CORRECTION

Patent No. 3,690,539  Dated September 12, 1972

Inventor(s) Joseph A. Geiger

It is certified that error appears in the above-identified patent and that said Letters Patent are hereby corrected as shown below:

Column 2, last line, cancel "in the manner of a hand". Column 7, line 31, cancel "a valve". Column 10, line 3, "pocket," should read -- of -- .

Signed and sealed this 2nd day of January 1973.

(SEAL)
Attest:

EDWARD M. FLETCHER, JR.  ROBERT GOTTSCHALK
Attesting Officer  Commissioner of Patents